(12) United States Patent
Nishi et al.

(10) Patent No.: US 6,563,855 B1
(45) Date of Patent: May 13, 2003

(54) WATER JACKET OF ARC FURNACE

(75) Inventors: Makoto Nishi, Nagasaki-Ken (JP); Masao Maesato, Iwaki (JP); Tosirou Takami, Iwaki (JP)

(73) Assignee: Shinto Kogyo Kabushiki Kaisha, Nagasaki (JP)

( * ) Notice: Subject to any disclaimer, the term of this patent is extended or adjusted under 35 U.S.C. 154(b) by 0 days.

(21) Appl. No.: 10/148,594

(22) PCT Filed: Dec. 3, 1999

(86) PCT No.: PCT/JP99/06806
§ 371 (c)(1), (2), (4) Date: Jun. 3, 2002

(87) PCT Pub. No.: WO01/40728
PCT Pub. Date: Jun. 7, 2001

(51) Int. Cl.[7] .................................... F27D 1/12
(52) U.S. Cl. ........................ 373/76; 373/71; 373/73
(58) Field of Search .................... 373/2, 9, 71, 72, 373/73, 74, 75, 76, 77; 432/238, 248; 266/193, 241; 110/336

(56) References Cited

U.S. PATENT DOCUMENTS 4,637,034 A * 1/1987 Grageda .................. 373/76
5,426,664 A * 6/1995 Grove .................... 373/76
6,137,823 A * 10/2000 Johnson et al. ........... 373/76

FOREIGN PATENT DOCUMENTS

| JP | 54-24693 | 8/1979 |
| JP | 1-8947 | 3/1989 |
| JP | 8-193257 | 7/1996 |

* cited by examiner

*Primary Examiner*—Tu Ba Hoang
(74) *Attorney, Agent, or Firm*—Wenderoth, Lind & Ponack, L.L.P.

(57) ABSTRACT

A metal-made water-cooling jacket for electric arc furnaces, characterized by comprising an Al diffusion layer having a thickness ranging from 200 to 800 $\mu$m, the Al concentration of the outermost surface of the Al diffusion layer being from 10 to 50 wt. %, formed on the surface of the metal by calorizing treatment.

4 Claims, 2 Drawing Sheets

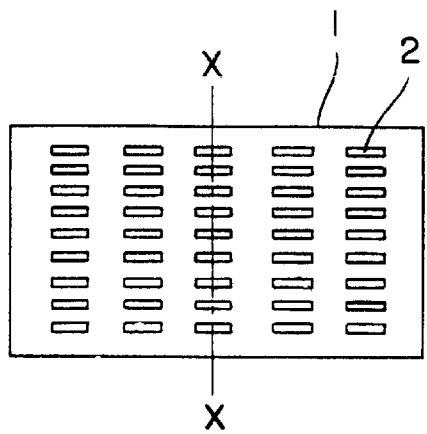
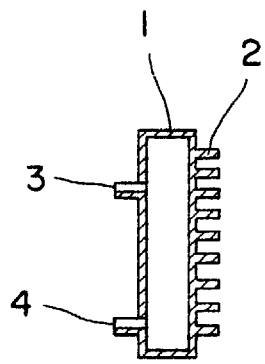
FIG. 1(a)    FIG. 1(b)
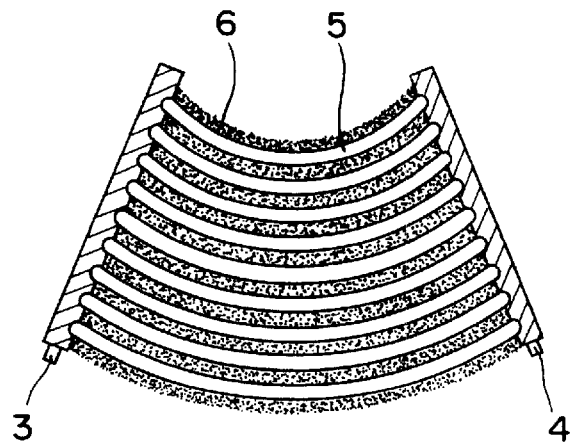
FIG. 2
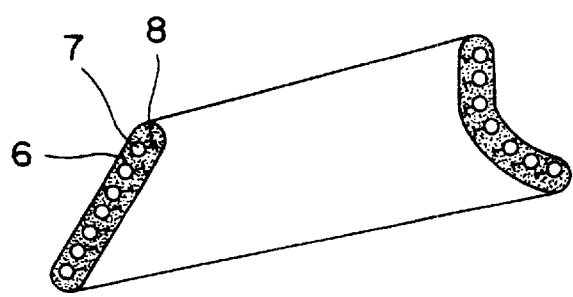
FIG. 3

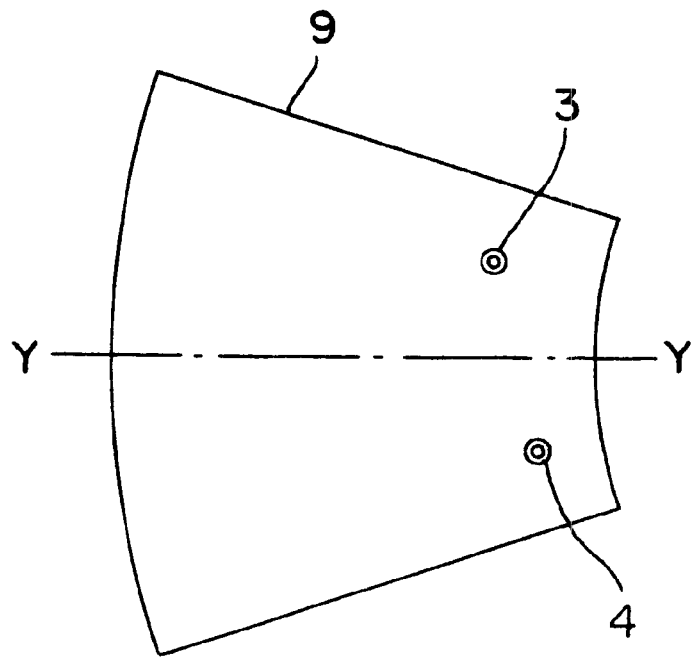
F I G. 4(a)
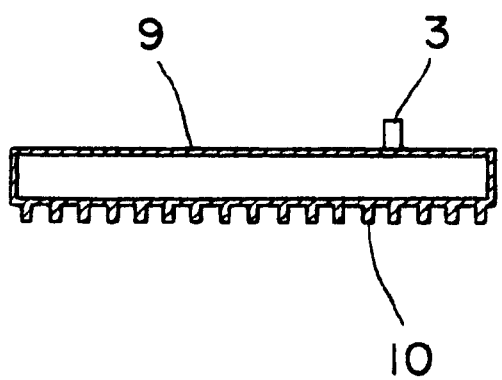
F I G. 4(b)

WATER JACKET OF ARC FURNACE

FIELD OF THE INVENTION

The present invention relates to novel water-cooling jackets that are chiefly used in electric arc furnaces for steelmaking.

BACKGROUND ART

The internal sections of electric arc furnaces for steelmaking, such as inner walls, ceilings and dust collection port other than those ones that are made with refractories and that come direct contact with molten steel, for example, bottom linings, lower side walls, tapping trough and slag-off holes, are cooled by water so that they can withstand high temperatures. Water-cooling devices for use in electric arc furnaces are called "water-cooling jackets", "water-cooling panels", "water-cooling boxes", "water-cooling pipes" or the like, depending upon the structure and shape. In this specification, the term "water-cooling jacket" is used to describe the present invention.

Water-cooling jackets in various shapes are illustrated in the accompanying drawings. FIGS. 1(a) and 1(b) show a water-cooling jacket for inner walls, which is a welded structure 1 made by the use of carbon steel plates. A cooling water channel having a water inlet 3 and a drain port 4 is provided in the inside of this jacket so that cooling water at a temperature of 40 to 70° C. can flow evenly throughout the jacket. Further, a large number of steel-plate-made slag catchers 2, each having a thickness of 25 mm, a width of 50 mm and a length of 130 mm are welded to the outer surface of the jacket. These slag catchers 2 are provided in order to positively catch, at the surface of the water-cooling jacket, the slag scattered in the furnace; they can also serve as studs, which are often provided in the case where the slag catchers are covered with a refractory material.

FIG. 2 shows a water-cooling jacket for ceilings. This jacket comprises concentrically arranged many water-cooling pipes 5 made of carbon steel, covered with a castable refractory 6. Cooling water at the above-described temperature is fed to the water-cooling pipes 5 from a water inlet 3, and discharged from a drain port 4. FIG. 3 shows a water-cooling jacket for dust collection port. This jacket comprises a water-cooling pipe 7 made of carbon steel, coiled into a nearly cylindrical configuration, and studs 8 welded to the surface of the water-cooling pipe 7, the pipe 7 and the studs 8 being covered with a castable refractory 6. FIGS. 4(a) and 4(b) show a water-cooling jacket for ceilings. The basic structure and the plate thickness of this jacket are the same as those of the water-cooling jacket for inner walls shown in FIG. 1. However, since the slag deposited on the slag catchers made with steel plates easily comes off and falls, a deformed bar is used, instead of steel plates, to provide slag catchers 10 on the outside of the body 9 of the jacket shown in FIG. 4. Specifically, a deformed bar having a diameter of 25 mm is cut into small pieces of 30 mm in length, and these pieces are welded to the body with the space of approximately 75 mm. Reference numeral 3 denotes a water inlet, and reference numeral 4 denotes a drain port.

Owing to arc heat in the process of melting and refining scrap steel, combustion heat of fuel generated by a stabilizing burner, combustion heat of carbon powder, aluminum ashes, etc. generated when they are added to a furnace or to molten steel, and gasses emitted when vinyl chloride, etc. contained in scrap steel are burned, the surfaces of the aforementioned water-cooling jackets are exposed to high-temperature (more than 1300° C.) oxidizing and corrosive atmospheres for a long period of time. At the same time, splashes of the molten steel and slag at temperatures of more than 1500° C. repeatedly deposit on and come off the surfaces of the water-cooling jackets, so that the surfaces of the jackets are rapidly heated by the molten steel and slag, and then rapidly cooled by cooling water. Further, in the case of the water-cooling jacket incorporated into the inner wall of a furnace, the jacket directly receives mechanical shock when scrap steel is charged, so that the falling of the slag catchers, the deterioration of the welded joints, the abrasion of the steel plate surfaces, and the deformation of the water-cooling jacket are extremely accelerated.

The water-cooling jacket for dust collection port is constantly exposed to a high-temperature oxidizing, corrosive and abrasive atmosphere. This is because, unlike the inner wall and ceiling of a furnace, a large amount of exhaust gas at a high temperature of more than 1000° C., containing dusts is constantly passing through the dust passage at a high speed.

Thus, water-cooling jackets for electric arc furnaces are used, regardless of parts of furnaces for which the jackets are used, under such extremely aggressive conditions that oxidation, corrosion, thermal shock, mechanical shock and abrasion are brought about at high temperatures.

On the other hand, water-cooling jackets that are fixed to the inside of arc furnaces are large-sized structures, so that they are divided into 20–40 parts and then incorporated. The production of such large-sized water-cooling jackets requires great cost. Moreover, the replacement of the jackets requires much labor and a long time, so that it inevitably requires heavy expenditure, increasing the steelmaking cost. It is thus desirable that the life of water-cooling jackets be as long as possible.

In the extremely aggressive environments as mentioned above, it is unavoidable that the slag catchers and the refractories with which the slag catchers are covered fall with the passage of time, and the surfaces of the jacket bodies are eventually bared. The decisive causes of the falling of the slag catchers are cracks formed in welded joints due to repetitive heating and cooling, and, in the case of the water-cooling jacket for inner walls, mechanical shock given to the slag catchers in high-temperature environments when scrap steel is charged. The causes of the falling of the refractories are as follows: the slag deposited on the refractories comes off together with the refractories; and the studs that serve to prevent the falling of the refractories are oxidized and abraded at high temperatures, and become impossible to hold the refractories any more. If the surfaces of the jacket bodies are bared in this manner, they are exposed to high temperatures, and the strain energy that developed in steel plates when they were weld-bonded to make the water-cooling jackets is partially released. As a result, the jackets begin to entirely undergo deformation, and the welded joints are cracked due to repetitive abrasion, thermal shock and mechanical shock, especially mechanical shock. Cracking then spreads even to the steel plates themselves, inducing water leakage.

Water leakage disturbs the flow of water in the jackets, and some parts of the jackets are insufficiently cooled and become very hot, inducing further cracking. Moreover, water that leaks into the furnaces can cause steam explosion. It is therefore very important to repair water leakage earlier. To repair leakage, it is firstly needed to suspend operation after the steel produced is tapped, and to cool down the inside of the furnace; the leaks are then weld-repaired. The suspension of operation directly raises the steelmaking cost, so that it is necessary to complete the repair in a period of time as short as possible. To attain this, it is inevitable to conduct operations at high temperatures; however, this is unfavorable from the viewpoints of safety and hygiene.

The thus cracked parts are weld-repaired from the surface side; however, welding can reach only to a depth equal to about ⅓ of the thickness of the steel plate, and the other portion (about ⅔ of the thickness) remains cracked. The weld-repaired parts therefore become weaker than non-repaired parts, and those parts that have been once cracked tend to be cracked again even after they are repaired. The once repaired parts and newly cracked parts are repeatedly repaired so as to use the jackets until the scheduled date of replacement, that is, the date of normal shutdown. However, if it is realized that the jackets cannot endure until the scheduled date, the date of normal shutdown is advanced, or only the leaked water-cooling jackets are replaced earlier. At any rate, these are unscheduled repairs, so that not only the production schedule is upset, but also extra cost is required. The life of water-cooling jackets greatly varies depending upon the inner structure of a furnace in which the jackets are used and the conditions under which the jackets are used; the life is, however, generally about 6 to 24 months. Although the date of replacement is fixed based on experience, it is the actual circumstances that water leakage is repaired or cracked jackets are replaced earlier than the scheduled date. This costs a great deal and requires a lot of time, and, moreover, it is necessary to conduct operations in undesirable environments. Prolongation of the life of water-cooling jackets is essential to attain stable operation, to decrease the repair cost, and to avoid repair operations at high temperatures. It is however the current situation that no effective measures have been taken at all to extend the life of water-cooling jackets.

DISCLOSURE OF THE INVENTION

An object of the present invention is to provide water-cooling jackets for electric arc furnaces that can be stably used for a prolonged period of time even under such extremely aggressive conditions that oxidation, corrosion, mechanical shock, thermal shock and abrasion are brought about at high temperatures.

In the earnest studies we made in order to attain the above object, we remarked calorizing treatment, which had conventionally been known as a treatment for imparting high-temperature corrosion resistance. This calorizing treatment by which aluminum is diffused into a base material has the following characteristics:

(1) the Al diffusion layer formed by this treatment is excellent in resistance to oxidation;

(2) the $Al_2O_3$ protective film formed in an oxidizing atmosphere is highly stable and hardly comes off;

(3) the Al diffusion layer has a surface hardness several times as high as that of the base material, so that it is excellent in abrasion resistance;

(4) Al diffused into the base material from its surface is alloyed with components of the base material to form an Al diffusion layer, so that this Al diffusion layer is highly resistant to thermal shock and hardly comes off; and (5) almost all of the strain energy existing in an object itself to be treated is released during the calorizing process, so that the calorized object is scarcely deformed by heat that is applied upon use.

We finally found that it was possible to impart improved resistance to oxidation, corrosion, abrasion, thermal shock and mechanical shock, especially resistance to mechanical shock at high temperatures to water-cooling jackets for use in electric arc furnaces without impairing the mechanical properties of base materials by subjecting the jackets to calorizing treatment having the aforementioned characteristics, thereby forming, only on the surfaces of the jackets, Al diffusion layers that have high Al concentrations and that never come off. The present invention was accomplished on the basis of this finding.

Namely, the present invention provides a metal-made water-cooling jacket for electric arc furnaces, comprising an Al diffusion layer having a thickness ranging from 200 to 800 µm, the Al concentration of the outermost surface of the Al layer being from 10 to 50 wt. %, formed on the surface of the metal by calorizing treatment.

Preferably, the material of the water-cooling jacket according to the present invention is carbon steels, that is, steels containing less than 1.0% carbon, less than 2.0% Si, less than 2.0% Mn, less than 2.0% Cr and less than 2.0% Ni, represented by the steels SS 400 and SGP defined by the Japanese Industrial Standard (JIS). If the stainless steel JIS SUS304, which is known as heat and corrosion-resistant steel, is used, a jacket having improved resistance to heat and corrosion can be obtained. However, since the thermal conductivity of this stainless steel is as low as about ⅓ of that of carbon steels, water circulating in the jacket cannot efficiently cool the plates of the stainless steel. As a result, the temperature of the stainless steel plates rises high, and the plates tend to be distorted and cracked. In addition, the stainless steel plates inherently have such a tendency that they are cracked at welded joints more easily than carbon steel plates. For this reason, the use of the stainless steel is not remarkably effective to prolong the life of water-cooling jackets.

In the present invention, the Al concentration of the outermost surface of the Al diffusion layer (the Al concentration of the 20-µm thick outermost layer) is limited to 10–50 wt. % as mentioned above. The reason for this is as follows: if the Al concentration is less than 10 wt. %, improvement in resistance to oxidation, corrosion and mechanical shock at high temperatures cannot be expected, while if the Al concentration exceeds 50 wt. %, the Al diffusion layer becomes excessively rigid and brittle, so that it is easily cracked and comes off. Further, in the present invention, the thickness of the Al diffusion layer is limited to the range between 200 µm and 800 µm. This is because the water-cooling jacket of the invention is used in an extremely aggressive environment as mentioned previously, so that the desired effects can scarcely be obtained if the thickness of the Al diffusion layer is as small as less than 200 µm. Moreover, to obtain an Al diffusion layer having a thickness as great as more than 800 µm, it is necessary to carry out the calorizing treatment by heating at a high temperature of more than 1100° C. for a long time of 20 to 30 hours; this requires remarkably increased calorizing treatment cost. To form such a thick Al diffusion layer is thus unfavorable from the viewpoint of cost effectiveness. The surface hardness of the Al diffusion layer is generally from 350 to 1000 mHV; this is 3 to 7 times as high as the surface hardness of the base material. Therefore, the water-cooling jacket covered with such an Al diffusion layer can show extremely high abrasion resistance even at high temperatures.

The calorizing treatment is carried out in the following manner: an object to be treated, that is, a water-cooling jacket made with common steel as mentioned above, and a calorizing powder prepared by mixing 10 to 80 wt. % of iron-aluminum alloy powder containing 20 to 60 wt. % of aluminum, or 10 to 80 wt. % of aluminum powder with 20 to 90 wt. % of alumina powder and 0.1 to 2 wt. % of ammonium chloride powder serving as an accelerating agent are placed in a semi-airtight container, and heated in a heating oven at a temperature of 600 to 1100° C. for 5 to 20 hours in a non-oxidizing atmosphere, preferably an inert or reducing gas atmosphere such as an atmosphere of argon, nitrogen or hydrogen.

The thus calorized water-cooling jacket for electric arc furnaces shows improved resistance to oxidation, corrosion and abrasion at high temperatures, and is hardly distorted even when it receives thermal shock. Moreover, the jacket has improved shock resistance, so that it is not cracked at welded joints, and leakage of water thus scarcely occurs even when the jacket is used for a prolonged period of time. The calorized jacket therefore has an extended life span. It was unexpected that the high-temperature shock resistance of water-cooling jackets would be greatly improved by calorizing treatment.

BRIEF DESCRIPTION OF THE DRAWINGS

FIG. 1(a) is a plan view of a water-cooling jacket for furnace inner walls used in Example 1, FIG. 1(b) is a cross-sectional view taken along line X—X in FIG. 1(a), FIG. 2 is a cross-sectional view of a water-cooling jacket for ceilings, FIG. 3 is a cross-sectional view of a water-cooling jacket for dust passages used in Example 2, FIG. 4(a) is a plan view of a water-cooling jacket for ceilings used in Example 3, and FIG. 4(b) is a cross-sectional view taken along line Y—Y in FIG. 4(a).

In the drawings, reference numerals 1 to 10 have the following meanings:

1: body of water-cooling jacket for furnace inner walls,
2: plate-like slag catcher,
3: water inlet,
4: drain port,
5: water-cooling pipe of water-cooling jacket for ceilings,
6: castable refractory,
7: water-cooling pipe of water-cooling jacket for dust passages,
8: stud,
9: body of water-cooling jacket for ceilings, and
10: cylindrical slag catcher.

BEST MODE FOR CARRYING OUT THE INVENTION

The present invention will now be explained more specifically by referring to the following Examples.

EXAMPLE 1

A water-cooling jacket for furnace inner walls as shown in FIG. 1 was incorporated into a part of the inner wall of an electric arc furnace for steelmaking having a nominal capacity of 80 tons, the life of this part of the inner wall being particularly short. The body of this jacket is in the shape of a box made by weld-bonding 16-mm thick plates of the carbon steel SS400. Although not shown in the figure, the inside of the body is divided into small cells, and designed so that cooling water at a temperature of 40 to 70° C. can evenly flow through the cells. To the outer surface of this body, that is, to the furnace side surface of the body, 45 plate-like slag catchers 2 made of the steel SS400, each having a thickness of 25 mm, a width of 50 mm and a length of 130 mm were welded. The surfaces of these slag catchers are not covered with a refractory material so that the slag formed in the process of melting and refining scrap steel can deposit on them to form a layer that can protect the water-cooling jacket. The slag catchers promote the deposition of the slag, so that they have the effect of extending the life of the water-cooling jacket. However, the protective layer partly comes off due to thermal shock repeatedly given to the jacket during operation, and to mechanical shock given to the jacket when scrap steel is charged, so that the surface of the water-cooling jacket is partially bared. Since the slag layer is repeatedly formed and comes off during operation, the slag catchers are gradually abraded and lose their slag-catching effect. In addition, the welded joints on the slag catchers and on the jacket body and the surfaces of the steel plates are cracked due to strong thermal shock and mechanical shock brought about by splashing of the slag at high temperatures of more than 1500° C., and water begins to leak at the cracks. In such a conventional water-cooling jacket, a large number of cracks spread especially from the welded joints on the slag catchers when the jacket is used for 3 to 5 months, and water beings to leak. Repeatedly repairing such leaks, the jacket is used for 8 months until the scheduled date of replacement.

A water-cooling jacket for furnace inner walls of the above-described material and size was subjected to calorizing treatment to obtain a jacket of the present invention. The calorizing treatment was carried out in the following manner: the water-cooling jacket to be treated, and a calorizing powder by mixing 70 wt. % of iron-aluminum alloy powder containing 50 wt. % of Al with 29 wt. % of alumina powder and 1 wt. % of ammonium chloride were placed in a semi-airtight container, and heated at 1000° C. for 10 hours in a non-oxidizing atmosphere to form, on the surface of the jacket, an Al diffusion layer having a surface hardness of 450 mHV and a thickness of 400 $\mu$m, the Al concentration of the outermost surface of the Al diffusion layer being 35 wt. %. This water-cooling jacket of the invention was incorporated into the same part of the furnace inner wall as that into which the conventional jacket had been incorporated, and used. No water leakage occurred at all for 8 months, that is, before the scheduled date of replacement. The jacket of the invention was removed from the furnace, and all of the welded joints on the slag catchers were inspected. As a result, no cracks were found either on the welded joints or on the other parts of the slag catchers. In addition, six slag catchers selected at random from the 45 were removed and sectioned, and the cross-section of each slag catcher was microscopically observed. From this observation, it was confirmed that the thickness of the Al diffusion layer, varying depending upon the point at which the thickness was measured, was in the range between 200 $\mu$m and 400 $\mu$m and that it was possible to use the jacket of the invention for a further long period of time.

EXAMPLE 2

A water-cooling jacket for dust passages shown in FIG. 3 was attached to an electric arc furnace for steelmaking having a nominal capacity of 50 tons.

FIG. 3 is a cross-sectional view of the water-cooling jacket. A water-cooling pipe for the water-cooling jacket is made with a long pipe, which is coiled nearly spirally; the inside end of this water-cooling pipe is connected to a water inlet, and the other end is connected to a drain port; and cooling water at a temperature of 40 to 70° C. is allowed to constantly flow in this pipe. M 12 bolts made with carbon steel, each having a total length of 25 mm and an outer diameter of 12 mm are welded with a pitch of 100 mm to the inner surface of the water-cooling pipe as studs for preventing a refractory material from falling. The water-cooling pipe herein is a pipe of the carbon steel JIS STPG 40A useful for pressure piping, having a schedule of 80 and a thickness of 5.1 mm; and this pipe is entirely covered with a castable refractory 6 having a thickness between 110 mm and 130 mm. The furnace exhaust gas flows upward from the bottom in the figure. Although the water-cooling jacket for dust passages is positioned at the level almost the same as that of the furnace ceiling and this level is apart from the slag face, the deposition of the splashed slag on the jacket is unavoidable. Early in the stage, the slag deposits on the castable refractory by which the water-cooling pipe is protected. However, as the amount of the deposited slag increases, it becomes difficult for the castable refractory to withstand the weight of the slag. The castable refractory layer is eventually broken at the middle thereof, and falls in the furnace together with the slag deposited. The slag repeatedly deposits and comes off, so that the studs by which the castable refractory is held are bared. From this onward, the bare studs are constantly exposed to the exhaust gas, and thus rapidly wear to lose their function. Further, as the falling of the castable refractory proceeds, the water-cooling jacket is exposed to high temperatures. By this, the strain energy remaining in the water-cooling jacket is released, and the jacket itself is thus greatly deformed to accelerate the falling of the castable refractory. Finally, a large part of the water-cooling pipe is bared, and the pipe rapidly wears due to corrosion and abrasion. In such a conventional water-cooling jacket, those parts that have been intensely corroded and abraded are holed after the jacket is used for 5 to 6 months, and water begins to leak. The number of leaks increases with use. Repeatedly repairing such leaks, the water-cooling jacket is used for 10 months, and then replaced with a new one. However, for about one month before the scheduled date of replacement, it is necessary to repair leaks every day so as to continue the operation.

A water-cooling jacket made by using a carbon steel pipe of the above-described material and size, not yet covered with a refractory material was subjected to calorizing treatment under the same conditions as in Example 1, thereby forming, on the outer surface of the water-cooling pipe and studs, an Al diffusion layer having a surface hardness of 450 mHV and a thickness of 400 $\mu$m, the Al concentration of the outermost surface of the Al diffusion layer being 35 wt. %. Thereafter, this pipe was covered with a castable refractory in the following manner: a refractory material powder and a binder powder were kneaded together with water, and the resulting mixture and the above pipe to be treated were placed in a frame, and allowed to stand for drying and hardening; the frame was then removed to obtain the pipe having on its surface a castable refractory layer with a thickness of 100 to 130 mm. This water-cooling jacket of the present invention was attached to the same part of the furnace as that to which the conventional jacket had been attached, and used. No water leakage was found for 10 months before the scheduled date of replacement. When 10 months passed, the jacket was removed from the furnace, and inspected. As a result, it was found that the tips of about half the number of the studs were bared but that the water-cooling pipe remained almost entirely covered with the castable refractory, the bare part being extremely small. Further, the bare part, that is, the most severely damaged part of the water-cooling pipe was sectioned, and the cross-section was microscopically observed. From this observation, it was found that, although the Al diffusion layer had been abraded to 100 to 200 $\mu$m, the pipe was still entirely covered with the Al diffusion layer, and that the base material remained intact. In addition, the water-cooling pipe was sectioned at randomly selected two points where the pipe had been covered with the castable refractory, and the cross-sections were microscopically observed. From this observation, it was found that the Al diffusion layer had a thickness ranging from 380 to 420 $\mu$m and had not been abraded at all. It was thus confirmed that it was possible to use the water-cooling jacket of the present invention for a further 10 months or more.

EXAMPLE 3

A water-cooling jacket for ceilings as shown in FIG. 4, having cylindrical slag catchers 10 provided on the outer surface of its body 9 at equal spaces by welding steel rods was made with 16-mm thick plates of the carbon steel SS 400. This water-cooling jacket was incorporated into a part of the ceiling of an electric arc furnace for steelmaking having a nominal capacity of 60 tons, which part would be most intensely damaged in a shorter period of time. In the case of this conventional water-cooling jacket for ceilings, it is not easy to conduct weld-repair operations unlike in the case of water-cooling jackets for inner walls. This jacket is therefore usually replaced after it is used for 7 to 10 months, before water leakage becomes serious.

A water-cooling jacket of the above-described shape and material was subjected to calorizing treatment by using the same calorizing powder in Example 1, heating at 1080° C. for 20 hours, thereby forming, on the outer surface of the slag catchers and body, an Al diffusion layer having a surface hardness of 500 mHV and a thickness of 700 $\mu$m, the Al concentration of the outermost surface of the Al diffusion layer being 40 wt. %. This water-cooling jacket of the invention was incorporated into the same part of the furnace as that into which the conventional jacket had been incorporated. Although 15 months have passed since then, water leakage has not been found so far. When 10 months passed, the appearance of the water-cooling jacket was observed. As a result, it was found that the water-cooling jacket was entirely covered with a layer of the slag and had no bare parts, and that the slag catchers were effectively functioning without falling. It can thus be appreciated that the life span of the water-cooling jacket of the present invention is at least twice longer than that of the conventional jacket.

What is claimed is:

1. A metal-made water-cooling jacket for electric arc furnaces, characterized by comprising an Al diffusion layer having a thickness ranging from 200 to 800 $\mu$m, the Al concentration of the outermost surface of the Al diffusion layer being from 10 to 50 wt. %, formed on the surface of the metal by calorizing treatment.

2. The water-cooling jacket according to claim 1, wherein the calorizing treatment is carried out by placing, in a semi-airtight container, an object to be treated and a calorizing powder by mixing 10 to 80 wt. % of iron-aluminum alloy powder containing 20 to 60 wt. % of aluminum, or 10 to 80 wt. % of aluminum powder with 20 to 90 wt. % of alumina powder and 0.1 to 2 wt. % of ammonium chloride powder serving as a accelerating agent, and heating them in a heating oven at a temperature of 600 to 1100° C. for 5 to 20 hours in a non-oxidizing atmosphere.

3. The water-cooling jacket according to claim 1, wherein the Al diffusion layer has a surface hardness of from 350 to 1000 mHV.

4. The water-cooling jacket according to claim 1, wherein the metal is carbon steel.

* * * * *